United States Patent [19]

Geary, Jr. et al.

[11] 4,189,156
[45] Feb. 19, 1980

[54] SEAL SYSTEM FOR A TURBOMACHINE EMPLOYING WORKING FLUID IN ITS LIQUID PHASE AS THE SEALING FLUID

[75] Inventors: Carl H. Geary, Jr., Greensburg; Norman A. Samurin, Irwin; Frank H. Athearn, Greensburg, all of Pa.

[73] Assignee: Carrier Corporation, Syracuse, N.Y.

[21] Appl. No.: 913,619

[22] Filed: Jun. 8, 1978

[51] Int. Cl.² ............................................. F16J 15/40
[52] U.S. Cl. ......................................... 277/1; 277/3; 415/112; 415/176
[58] Field of Search ............... 277/3, 27, 59, 71, 72 R, 277/72 FM, 74, 75, 79, 1, 15; 415/111, 112, 175, 176

[56] References Cited

U.S. PATENT DOCUMENTS

| | | | |
|---|---|---|---|
| 2,965,398 | 12/1960 | Keller et al. | 415/112 X |
| 3,235,269 | 2/1966 | Olesen | 277/1 |
| 3,302,951 | 2/1967 | Olesen | 277/1 |
| 3,792,935 | 2/1974 | Randell | 415/112 X |
| 3,909,012 | 9/1975 | Denis | 415/175 X |
| 3,949,996 | 4/1976 | Inoue et al. | 277/27 X |
| 4,005,580 | 2/1977 | Swearingen | 277/15 X |

FOREIGN PATENT DOCUMENTS

| | | | |
|---|---|---|---|
| 269190 | 5/1928 | United Kingdom | 277/3 |
| 270270 | 7/1928 | United Kingdom | 277/3 |

*Primary Examiner*—Robert S. Ward, Jr.
*Attorney, Agent, or Firm*—J. Raymond Curtin; Barry E. Deutsch

[57] ABSTRACT

A seal system for a turbomachine employing first fluid as a working medium and utilizing the same fluid in its liquid phase as a sealing medium. The pressure of the liquid sealing medium is maintained above the pressure of the working medium. The fluid is delivered to a first sealing region whereat the fluid flows in opposite directions along the shaft of the turbomachine, respectively towards the ambient and towards the working region in the machine. A seal is interposed between the first sealing region and the ambient to prevent the seal fluid from intermixing with air.

4 Claims, 2 Drawing Figures

SEAL SYSTEM FOR A TURBOMACHINE EMPLOYING WORKING FLUID IN ITS LIQUID PHASE AS THE SEALING FLUID

BACKGROUND OF THE INVENTION

This invention relates to a seal system for a turbomachine and in particular, to a turbomachine wherein the seal fluid employed to maintain the working medium within the working region of the machine is completely miscible within the working medium.

As is well-known to those skilled in the art, the utilization of seals on turbomachines, such as compressors and expanders or turbines, is extremely important to maintain the working fluid of the machine within the machine's working region, and simultaneously to prevent the flow of contaminants into the machine from the ambient. Very often the seals are one of the most critical elements of the machine.

The recent fossil fuel shortage has created the need for alternative sources of energy. Geothermally heated fluids are considered to be one of the most likely candidates for producing a viable source of energy. Many of the recognized leaders in the field of power recovery from geothermally heated fluids have promoted the use of what is known in the art as a "binary system." A binary system involves the vaporization of a secondary heat transfer fluid, generally an organic fluid such as isobutane, by passing the secondary fluid in heat transfer relation with the geothermally heated fluid. The vapor thus formed is delivered to a turbomachine, whereat the vapor is expanded to generate power. The expanded vapor is thereafter condensed for repeat of the cycle.

As the cost of the secondary fluid is relatively high, it is essential that the seals employed on the expander be extremely reliable to prevent loss of the vaporous hydrocarbon fluid.

In many seals used in other applications, the sealing medium may either be steam or air. However, a seal employed in an expander using an organic or inorganic fluid as the working medium cannot employ either steam or air. Condensed steam can contaminate the working medium. Air cannot be used as a sealing with a medium expander using an organic fluid as the working medium, since a mixture of air and organic fluid is extremely explosive. An example of a combination steam and air seal is disclosed in U.S. Pat. No. 3,302,951. As indicated above, the system disclosed in this patent cannot at all be employed with an expander utilizing an organic or inorganic fluid as the working medium.

SUMMARY OF THE INVENTION

Accordingly, it is an object of this invention to provide a seal system particularly suitable for use with a turbomachine employing an organic or inorganic fluid as its working medium.

It is a further object of this invention to effectively maintain a working medium within the working region of a turbomachine by the use of an effective seal system.

It is still another object of this invention to utilize a seal system having a seal fluid that is completely miscible with an organic or inorganic fluid employed as the working medium in a turbomachine.

These and other objects of the present invention are attained in a seal system for a turbomachine utilizing an inorganic or organic fluid as a working medium. The seal system includes a source of fluid in its liquid phase, with the liquid seal fluid being essentially the same chemical composition medium so as to be miscible therein. The pressure of the seal fluid is maintained above the pressure of the working medium of the turbomachine. The liquid seal fluid is delivered to a first sealing region whereat the fluid flows in opposite directions along the shaft of the turbomachine, respectively towards the ambient and towards the working region of the machine. Seal means is interposed between the first sealing region and the ambient to prevent the seal fluid from intermixing with air.

DESCRIPTION OF THE PREFERRED EMBODIMENT

Figure 1:
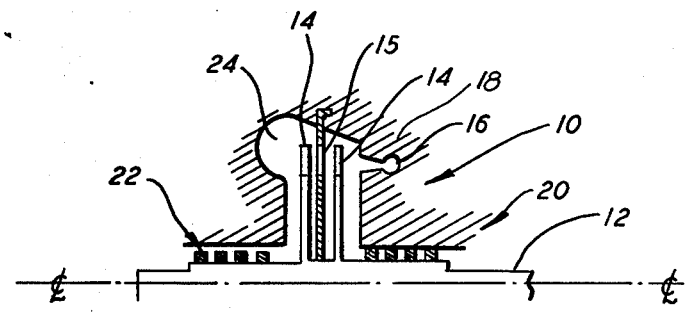
FIG. 1 is a somewhat schematic view of a portion of a turbomachine utilizing the present invention.

Referring now to the drawing, there is disclosed a preferred embodiment of the present invention. The invention will be particularly described as employed with an expander; however, it should be understood that the invention may be equally employed with other types of turbomachinery, as for example a centrifugal compressor or pump.

The expander 10 includes a shaft 12 having rotating blades 14 mounted thereon. Stator blades 15 are suitably connected to casing 18 of expander 10. A stationary nozzle 16 is mounted within casing 18 to direct the operating medium against the rotating blades to rotate shaft 12. Seal assemblies 20 and 22 to be more fully described hereinafter, are provided at either end of shaft 12.

As previously noted, when the operating or working medium is an inorganic or organic fluid, as for example when the expander is employed in a geothermal recovery system employing isobutane as the operating medium, it is essential that the seal assemblies prevent any significant loss of the operating medium from the expander to the environment, and in addition, operate to prevent admission of air or other contaminants into the machine.

Figure 2:
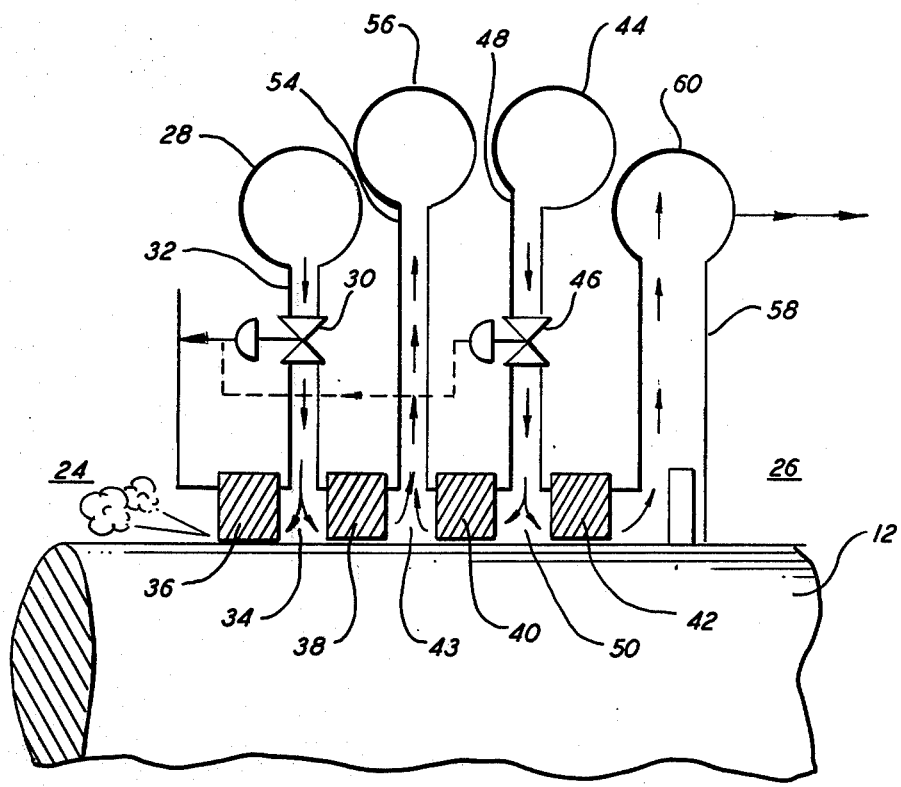
FIG. 2 is an enlarged view of a portion of the machine shown in FIG. 1 illustrating further details of the present invention.

Referring now particularly to FIG. 2, there will be described in detail the seal assembly of the present invention.

Preferably, each seal assembly includes at least four pressure breakdown bushings 36, 38, 40 and 42. As noted previously, one such seal assembly will be mounted at either end of the expander shaft 12. In the arrangement shown in FIG. 2, the seal assembly is disposed between the working region 24 in which blades 14 rotate and ambient 26.

A source of seal fluid 28 is provided, with the fluid being essentially the same chemical composition as the working medium so as to be miscible therein. For example, with isobutane as the working medium, the seal fluid delivered from source 28 may be liquid isobutane or isopentane. For convenience sake, the seal fluid will generally be identical to the fluid used as the working medium, since the working medium is a readily available source for the seal fluid. The seal fluid provided from source 28 is in its liquid phase. When expander 10 is employed in a Rankine cycle, the condenser of the cycle may serve as source 28. A conduit 32, having a valve 30 provided therein delivers the fluid from source 28 to a first sealing region 34. Valve 30 regulates the flow of fluid from conduit 32 to maintain the pressure of the fluid slightly greater than the pressure of the operating medium in region 24.

From first sealing region 34 the fluid will flow in opposite directions along shaft 12, respectively towards working region 24 and ambient 26. The radial clearance between the outer surface of shaft 12 and inner surface of bushing 36 is relatively small, thereby providing a limited flow area for the liquid seal fluid flowing from region 34 towards region 24. The resulting pressure reduction causes the seal fluid to flash into its vaporous state. Flashing of the seal fluid will remove heat from bushing 36 to prevent the bushing from overheating during operation of the expander. The vaporous seal fluid flowing from pressure breakdown bushing 36 will mix with the working medium in region 24 to generate power as a result of the expansion of the medium. Any "unflashed" seal fluid entering region 24 will undergo a change of state and become a vapor upon mixing with the working medium. Thus the seal fluid flowing towards region 24 may readily be recovered through condensation of the expanded working medium.

The sealing fluid flowing from region 34 through pressure breakdown bushing 38 will not undergo the same pressure reduction as there is a relatively large clearance between the bushing and the shaft. Thus, the seal fluid entering second sealing region 43 will remain substantially in its liquid phase. The liquid sealing fluid entering region 43 will mix with a second seal fluid, such as oil, provided from a source 44 through a conduit 48 having a valve 46 disposed therein. The magnitude of the pressure of the seal oil is maintained slightly greater when compared to the magnitude of the pressure of the sealing fluid provided through conduit 32. Valve 46 operates to maintain the required pressure differential. The second seal fluid flowing from source 44 passes into a third sealing region 50 whereat the seal flows in opposite directions along the shaft through breakdown bushings 40 and 42. As the pressure of the second seal fluid is slightly greater than the pressure of the first seal fluid, the second fluid will prevent the first seal from flowing through the breakdown bushing 40 towards ambient 26. In effect, the second seal fluid functions as a buffer fluid. The mixture of the first and second seal fluids thus obtained in sealing region 43 will pass through conduit 54 into a collecting region 56. Any vapor produced by the flashing of fluid through breakdown bushing 38 will be condensed upon contacting the relatively low temperature second seal fluid. At collection area 56, the first and second fluids may be separated through suitable means, as for example, by maintaining the pressure in area 56 above atmospheric, and thence delivering the mixture to a lower pressure region whereat the first seal fluid will separate from the second fluid due to the "flashing" of the first fluid. The separated first seal fluid may be returned to supply region 28 or other suitable point, as for example the condenser of a Rankine cycle, and the separated second seal fluid to supply region 44.

The second seal fluid through pressure breakdown bushing 42 prevents any air or other external contaminants from entering into the expander and mixing with either the operating medium or the first sealing fluid. In particular, it is essential that air be prevented from gaining entrance into the expander as any mixture of air and an organic working medium or sealing fluid is highly explosive. The air is prevented from entering the machine since the pressure of the second seal fluid is greater than the pressure of the ambient. The second seal fluid is collected in a collection area or sump 60 and is delivered thereto by a conduit 58.

The seal system thus described maintains the operating medium and the first seal fluid completely remote from the ambient to prevent any mixing of the second fluid or operating medium with external contaminants. In addition, the system prevents any contamination of the operating medium, as the operating medium and the first seal fluid are either identical or are completely miscible.

While a preferred embodiment of the present invention has been described and illustrated, the invention should not be limited thereto but may be otherwise embodied within the scope of the following claims.

What is claimed is:

1. A method of sealing a turbomachine employing a first fluid in its vaporous phase as the operating medium, comprising the steps of:

delivering a relatively small quantity of the fluid in its liquid phase to a first sealing region whereat the fluid flows in opposite directions along the shaft of the turbomachine, respectively towards the ambient and towards the working region of the machine;

reducing the pressure of the quantity of fluid flowing towards the working region whereby the fluid will flash into its vaporous state, with the vaporous fluid mixing with the operating fluid in the working region;

delivering the quantity of fluid flowing towards the ambient to a second sealing region disposed between the first sealing region and the ambient;

delivering a quantity of a second seal fluid to the second sealing region, with the pressure of the second seal fluid being somewhat greater than the pressure of the first seal fluid to prevent further flow of the first seal along the shaft;

mixing the first seal fluid with the second seal fluid at the second sealing region; and collecting the mixture of first and second seal fluids.

2. A method of sealing a turbomachine in accordance with claim 1 further including the step of;

delivering the second seal fluid to a third sealing region located between the second sealing region and the ambient, with the second seal fluid flowing in opposite directions along the shaft, with the flow of second seal fluid preventing any undesirable external contaminants from mixing with the first seal fluid.

3. A seal system for a turbomachine utilizing a first fluid in its vaporous phase as a working medium comprising;

a source of said first fluid in its liquid phase;

means to maintain the pressure of the liquid above the pressure of the working medium;

means to deliver said liquid fluid to a first sealing region whereat the fluid flows in opposite directions along the shaft of said turbomachine, respectively towards the ambient and towards the working region of the machine;

seal means interposed between said first sealing region and the ambient to prevent the first fluid from mixing with external contaminants; and a pressure breakdown bushing interposed between said first sealing region and the working region to reduce the pressure of the first fluid flowing towards the working region whereby the fluid will flash into its vaporous state for mixing with the vaporous working medium, the sealing fluid preventing the working fluid from escaping from the working region.

4. A sealing system in accordance with claim 3 wherein said seal means includes:

a second seal region interposed between said first seal region and said ambient;
a source of second seal fluid; and
means to deliver said second seal fluid to said second sealing region, including means to maintain the pressure of said second seal fluid slightly greater than the pressure of said first seal fluid to prevent the fluid from flowing past the second sealing region towards the ambient.

* * * * *